United States Patent
Wu et al.

(10) Patent No.: US 11,137,859 B2
(45) Date of Patent: Oct. 5, 2021

(54) METHOD AND APPARATUS FOR DETERMINING POINT REPORT POSITION OF TOUCH POINT, AND ELECTRONIC DEVICE

(71) Applicant: BEIJING XIAOMI MOBILE SOFTWARE CO., LTD., Beijing (CN)

(72) Inventors: Jing Wu, Beijing (CN); Ju Tang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/790,646

(22) Filed: Feb. 13, 2020

(65) Prior Publication Data
US 2021/0081096 A1 Mar. 18, 2021

(30) Foreign Application Priority Data
Sep. 17, 2019 (CN) .......................... 201910877239.X

(51) Int. Cl.
*G06F 3/041* (2006.01)
*G06F 1/16* (2006.01)

(52) U.S. Cl.
CPC ........ *G06F 3/04186* (2019.05); *G06F 1/1626* (2013.01); *G06F 3/0412* (2013.01)

(58) Field of Classification Search
CPC .............................................. G06F 3/041–048
See application file for complete search history.

(56) References Cited

U.S. PATENT DOCUMENTS

| 2011/0074649 | A1 | 3/2011 | Isom et al. | |
| 2014/0078085 | A1 | 3/2014 | Yeh | |
| 2014/0139462 | A1 | 5/2014 | Lin | |
| 2016/0291794 | A1* | 10/2016 | Kawamura | G06F 3/0488 |
| 2017/0168648 | A1* | 6/2017 | Takahashi | G06F 3/0445 |

FOREIGN PATENT DOCUMENTS

EP 2549366 A1 1/2013

OTHER PUBLICATIONS

OA for EP application 20163065.4, dated Oct. 2, 2020.

* cited by examiner

*Primary Examiner* — Roy P Rabindranath
(74) *Attorney, Agent, or Firm* — Syncoda LLC; Feng Ma

(57) ABSTRACT

A method for determining a point report position of a touch point includes: predicting whether an action between an Nth frame and an (N+1)th frame of a touch signal is a jitter or slide of a touch object during stay, according to position change information of a touch point in at least two frames before the (N+1)th frame of the touch signal; determining a position of the touch point at the Nth frame as the point report position of the touch point at the (N+1)th frame, if the action is the jitter; and determining the position of the touch point at the (N+1)th frame or a position close to the position of the touch point at the (N+1)th frame as the point report position of the touch point at the (N+1)th frame, if the action is the slide.

14 Claims, 4 Drawing Sheets predicting whether an action between an Nth frame and an (N+1)th frame of a touch signal is a jitter or a slide of a touch object during stay according to position change information of a touch point in at least two frames before the (N+1)th frame of the touch signal — 202 determining a position of the touch point at the Nth frame as the point report position of the touch point at the (N+1)th frame, if the action is the jitter of the touch object during stay — 204 determining the position of the touch point at the (N+1)th frame or a position close to the position of the touch point at the (N+1)th frame as the point report position of the touch point at the (N+1)th frame, if the action is the slide of the touch object during stay — 206

METHOD AND APPARATUS FOR DETERMINING POINT REPORT POSITION OF TOUCH POINT, AND ELECTRONIC DEVICE

CROSS-REFERENCE TO RELATED APPLICATION

This application claims priority to Chinese Patent Application No. 201910877239.X, filed on Sep. 17, 2019, the disclosure of which is hereby incorporated by reference in its entirety.

BACKGROUND

With the development of information technologies, smart phones, smart tablets and other electronic devices are playing an increasingly important role in users' daily lives. With the rapid development of screen technologies, display screens supporting touch operations have become the standard configuration of electronic devices.

SUMMARY

The present disclosure relates generally to a communication technology field, and more specifically to a method and an apparatus for determining a point report position of a touch point, an electronic device and a storage medium.

According to a first aspect of embodiments of the present disclosure, a method for determining a point report position of a touch point is provided. The method includes:

predicting whether an action between an Nth frame and an (N+1)th frame of a touch signal is a jitter or a slide of a touch object during stay, according to position change information of a touch point in at least two frames before the (N+1)th frame of the touch signal;

determining a position of the touch point at the Nth frame as the point report position of the touch point at the (N+1)th frame, if the action is the jitter of the touch object during stay; and determining the position of the touch point at the (N+1)th frame or a position close to the position of the touch point at the (N+1)th frame as the point report position of the touch point at the (N+1)th frame, if the action is the slide of the touch object during stay.

According to a second aspect of embodiments of the present disclosure, an apparatus for determining a point report position of a touch point is provided. The apparatus includes a memory and a processor configured to store instructions executable by the processor. The processor is configured to run a program corresponding to the instructions by reading the instructions stored in the memory, so as to implement the method described above.

According to a third aspect of embodiments of the present disclosure, an electronic device is provided. The electronic device includes a housing, a processor, a memory, a circuit board, a power supply circuit, and a touch screen. The circuit board is enclosed by the housing. The processor and the memory are positioned on the circuit board. The power supply circuit is configured to provide power for respective circuits or components of the electronic device. The touch screen is configured to receive an input from a touch object and to generate a touch signal. The processor is configured to predict whether an action between an Nth frame and an (N+1)th frame of the touch signal is a jitter or a slide of the touch object during stay, according to position change information of a touch point in at least two frames before the (N+1)th frame of the touch signal; and determine a position of the touch point at the Nth frame as the point report position of the touch point at the (N+1)th frame, if the action is the jitter of the touch object during stay; and determine the position of the touch point at the (N+1)th frame or a position close to the position of the touch point at the (N+1)th frame as the point report position of the touch point at the (N+1)th frame, if the action is the slide of the touch object during stay.

It should be understood that the foregoing general description and the following detailed description are only exemplary and illustrative, and cannot limit the present disclosure.

BRIEF DESCRIPTION OF THE DRAWINGS

The accompanying drawings, which are incorporated in and constitute a part of this disclosure, illustrate embodiments consistent with the specification and, together with the description, serve to explain principles of various embodiments of the disclosure.

DETAILED DESCRIPTION

Figure 1:
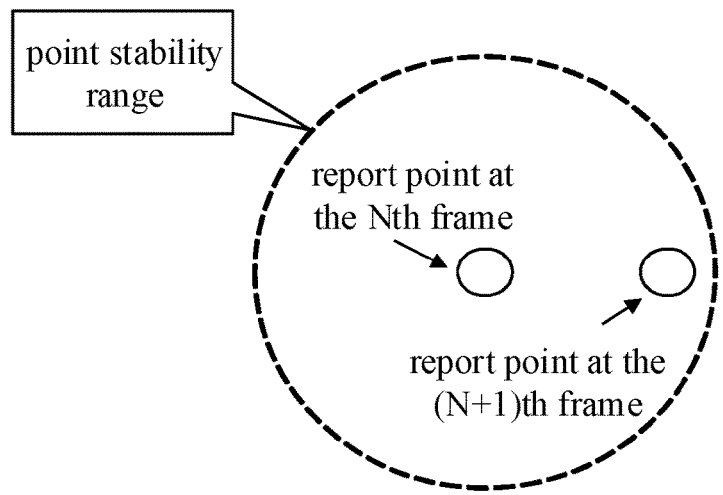
FIG. 1 is a schematic diagram of a point stability range illustrated according to the present disclosure.

Exemplary embodiments will be described in detail herein, examples of which are illustrated in the accompanying drawings. When the following description refers to the drawings, the same numeral in different figures indicates the same or similar element, unless otherwise specified. The embodiments described in the following exemplary embodiments do not represent all embodiments consistent with the present disclosure. Instead, they are merely examples of the device and method consistent with some aspects of the present disclosure that are described in detail in the accompanying claims.

The terms used in the present disclosure are intended solely to describe specific embodiments and are not intended to limit the present disclosure. The singular forms "one," "said" and "this" used in the present disclosure and the accompanying claims are also intended to include the plural forms, unless otherwise expressly indicated in the context. It should also be understood that the term "and/or" used herein refers to and includes any or all possible combinations of one or more associated listed items.

It should be understood that although terms "first," "second," "third" and the like may be used to describe information in the present disclosure, such information shall not be limited to such terms. These terms are only used to distinguish the same type of information from each other. For example, without departing from the scope of the present disclosure, the first information may also be referred to as the second information, and similarly, the second information may also be referred to as the first information. Depending on the context, the word "if" as used here may be interpreted as "when . . . " or "upon . . . " or "in response to determining . . . ."

A touch panel (TP) is a device that can accept input signals. Touch screens may include resistive touch screens and capacitive touch screens. Taking a capacitive touch screen as an example, when a user touches the capacitive touch screen, the user and a surface of the touch panel form a coupling capacitance due to an electric field of the human body. Since the touch panel is connected with a high frequency signal, the fingers absorb a very small current, which flows out from electrodes at four corners of the touch panel, and theoretically, the current flowing through each of the four electrodes is proportional to a distance from the finger to the corresponding corner of the touch panel. Therefore, by calculating the ratio among the four current values, a position of a touch point may be obtained and reported to a processing module, the process of which is referred to as "point report process."

A touch object, also known as a touch body, may be finger, palm, stylus and other operation body that can be recognized by the screen. When the touch object touches the screen, a signal collecting module may collect the touch signal. The signal collecting module is configured to collect touch signals. For example, the signal collecting module may be a touch sensor electrode.

In order to ensure a point stability, a range may be set on the basis of the reported point coordinate of the Nth frame, which is referred to as the point stability range of the Nth frame. For the points of the (N+1)th frame that do not exceed the point stability range, the coordinates of these points may be kept unchanged to avoid the change of coordinates caused by minor movement.

In order to ensure a hand following performance, it is expected that the reported point coordinate of the touch point of any frame is as close as possible to the actual position of the touch object, and it is preferred to use a smaller point stability range or to remove the point stability range.

In order to ensure that the touch point moves with the hand, the position of the new touch point is calculated for each tiny movement. The touch point jitter may occur due to frequent updates of the position of the touch point. The inventor found that it is disadvantage for the hand following performance if the coordinates of the touch point are determined by using the fixed size of point stability range every time. As illustrated in FIG. 1, which is a schematic diagram of the point stability range, based on the reported point of the Nth frame, there is a point stability range of fixed size (within the dotted circle). If the reported point of the (N+1)th frame is still within this range, the coordinate is kept the same with that of the Nth frame. Therefore, the coordinate of the (N+1)th frame is the same as that of the Nth frame, no movement is generated, and the point stability can be guaranteed. However, if the reported point of the (N+1)th frame is just at the edge of the point stability range, there will be a large distance between the reported point coordinate and the point coordinate that the hand actually touches the screen, for example, the distance between the reported point at the Nth frame and the reported point at the (N+1)th frame, which is disadvantage for the hand following performance.

For this, embodiments of the present disclosure provide a scheme for determining a point report position of a touch point, which predicts whether an action between the Nth frame and the (N+1)th frame is a jitter or a slide of the touch object during stay according to the position change information of the touch point in at least two frames before the (N+1)th frame of the touch signal, determines the position of the touch point at the Nth frame as the reported position of the touch point at the (N+1)th frame if the action is the jitter of the touch object, and determines the position of the touch point at the (N+1)th frame or the position close to the position of the touch point at the (N+1)th frame as the reported position of the touch point at the (N+1)th frame if the action is the slide of the touch object. By predicting the jitter and the slide, it realizes considering both the point stability, which avoids updating the point coordinate even for tiny coordinate jitter, and the hand following performance, which avoids a great distance between the reported point coordinate and the actual touch point coordinate of the touch object for ensuring the point stability.

Embodiments of the present disclosure may be applied in an electronic device containing a touch screen, or in a module for determining a position of a touch point, such as a touch screen IC of an electronic device. Touch screens mentioned in the present disclosure include in-cell, on-cell, OGS (One Glass Solution), G/G (Cover Glass/Sensor Glass, also known as touch function layer) and GFF (Cover Glass Film/Film, protective glass conductive layer/conductive layer) types of touch screen. In-cell refers to the method of embedding touch function into the LCD pixel of the display screen, that is, embedding touch sensor function inside the display screen. On-cell refers to the method of embedding the touch screen between the color filter substrate of the display screen and the polarizer, that is, providing the touch function on the LCD panel of the display screen. The OGS technology integrates the touch screen with the protective glass and coats the inner side of the protective glass with an ITO conductive layer. G/G and GFF touch screens refer to installing the touch detection device of the touch screen system on the upper layer of the display.

In embodiments of the present disclosure, the term "electronic device" includes a variety of handheld devices, on-board devices, wearable devices, computing devices, and the like with touch screens, for example, smart phones, tablets, smartwatches, PDAs (Personal Digital Assistant), e-readers, multimedia players and so on.

Figure 2:
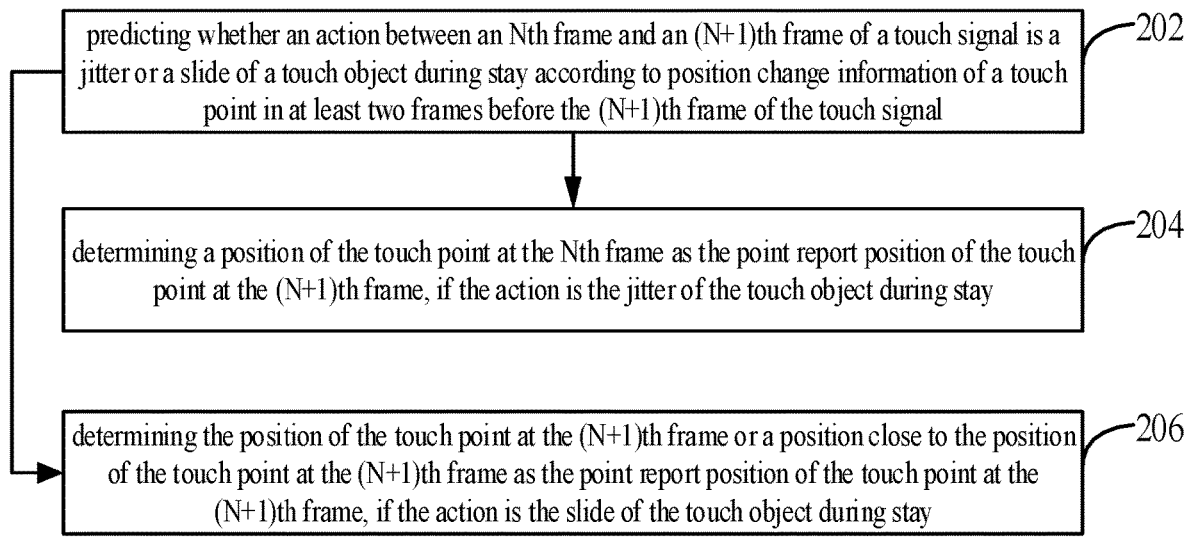
FIG. 2 is a flowchart of a method for determining a point report position of a touch point illustrated according to an exemplary embodiment of the present disclosure.

FIG. 2 is a flowchart of a method for determining a point report position of a touch point illustrated according to an exemplary embodiment of the present disclosure. As illustrated in FIG. 2, the method may include followings.

At block 202, it is predicted whether an action between an Nth frame and an (N+1)th frame of a touch signal is a jitter or a slide of a touch object during stay according to position change information of the touch point in at least two frames before the (N+1)th frame of the touch signal.

At block 204, a position of the touch point at the Nth frame is determined as the point report position of the touch point at the (N+1)th frame, if the action is the jitter of the touch object during stay.

At block 206, the position of the touch point at the (N+1)th frame or the position close to the position of the touch point at the (N+1)th frame is determined as the point report position of the touch point at the (N+1)th frame, if the action is the slide of the touch object during stay.

The at least two frames include the Nth frame and one or more frames before the Nth frame. It should be understood that, in this embodiment, the action in last two frames is predicated using data of previous several frames, and further the point report position of the touch point at the last frame is determined. For clarity, the last two frames are named the Nth frame and the (N+1)th frame.

In an embodiment, the at least two frames include the (N−1)th frame and the Nth frame, for realizing predicting the action in the last two frames by means of data of the previous two frames, i.e., predicting whether the action between the Nth frame and the (N+1)th frame is the jitter or slide of the touch object during stay by means of the position change information of the touch point in two frames.

The jitter of the touch object during stay may refer to minor coordinate change of the touch object during sliding, which type of action is expected to be ignored. The slide of the touch object may refer to a slightly greater coordinate change, which type of action is expected to reflect the movement of the touch point. Moreover, the movement of the touch object always has inertia, and thus it is possible to predict whether the action between the Nth frame and the (N+1)th frame is the jitter or the slide of the touch object during stay according to the position change information in the previous frames.

In an example, whether the action between the Nth frame and the (N+1)th frame is the jitter or the slide of the touch object during stay may be determined by the position of the touch point at the (N+1)th frame and the distance between the touch point at the Nth frame and the touch point at the (N+1)th frame. It should be understood that, the present disclosure is not limited to the distance between the touch point at the Nth frame and the touch point at the (N+1)th frame, the distance between other frames of the at least two frames may also be used to determine whether the action between the Nth frame and the (N+1)th frame is the jitter of slide of the touch object during stay.

In an example, determining whether the action between the Nth frame and the (N+1)th frame of the touch signal is the jitter or the slide of the touch object during stay, according to position change information of the touch point in at least two frames before the (N+1)th frame of the touch signal, includes:

determining a point stability range by using a value converted from a distance between the touch point at the Nth frame and the touch point at the (N+1)th frame as a range reference quantity and using the touch point at the Nth frame as a reference point;

determining that the action is the jitter of the touch object during stay, if the position of the touch point at the Nth frame is within the point stability range; and determining that the action is the slide of the touch object during stay, if the position of the touch point at the Nth frame is not within the point stability range.

The position change information of the touch point in the at least two frames may include the distance D between the touch point at the Nth frame and the touch point at the (N−1)th frame. The range reference quantity may be configured to determine a reference quantity of the point stability range, which may be a radius value or a short radium value or a long radius value, depending on a shape of the point stability range. For example, the shape of the point stability range may include but is not limited to a circle, and an oval. The range reference quantity may be converted from the distance between the touch point at the Nth frame and the touch point at the (N−1)th frame. For example, the range reference quantity may be a function related to the distance between the touch point at the Nth frame and the touch point at the (N−1)th frame. For example, the range reference quantity may be obtained based on multiplying the distance by a specified ratio. The specified ratio is less than or equal to 1.

For determining whether the position of the touch point at the (N+1)th frame is within the determined point stability range, as an example, the distance between the touch point at the Nth frame and the touch point at the (N+1)th frame may be directly compared with the range reference quantity.

Figure 3:
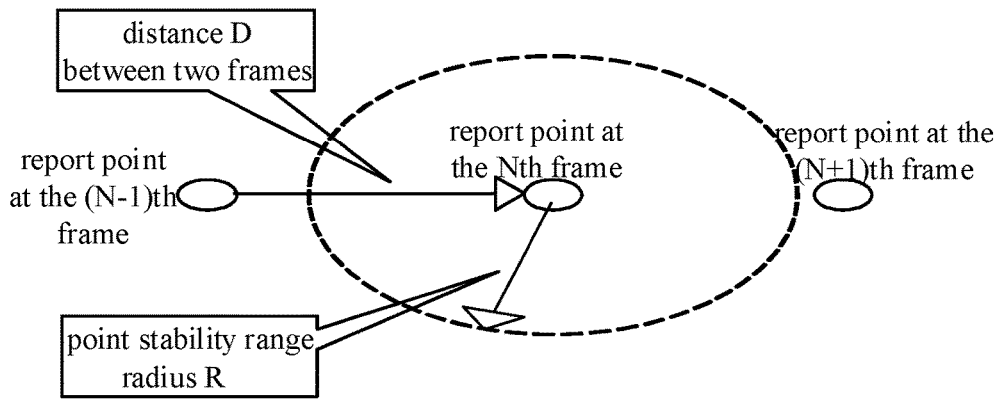
FIG. 3 is a schematic diagram of positions of touch points between multiple frames illustrated according to an exemplary embodiment of the present disclosure.

As illustrated in FIG. 3, which is a schematic diagram of positions of touch points between multiple frames illustrated according to an exemplary embodiment of the present disclosure, the radius R of the point stability range of the Nth frame may be determined according to the following formula:

$$R = R_{default} * \frac{D}{D_{default}}$$

where $$\frac{R_{default}}{D_{default}}$$

denotes the specified ratio, and D denotes the distance between the (N−1)th frame and the Nth frame. If the distance between the Nth frame and the (N+1)th frame is less than or equal to the radius R, it tends to consider the action as a micro jitter, and putting more importance on the stability, the coordinate reported to the system is closer to the position of the Nth frame. If the distance between the Nth frame and the (N+1)th frame is greater than the radius R, it tends to consider the action as the slide, and putting more importance on the hand following performance, the coordinate reported to the system is closer to the position of the (N+1)th frame. The specified ratio may be determined according to the platform, or the electronic device or other requirements. For example, if fast speed is expected, the specified ratio may be as small as possible in a certain extent, and if stability is expected or if limited by hardware requirements of the electronic device, the specified ratio may be greater, or even may be 1.

It should be understood that, the range reference quantity may also be determined by the distance between touch points in other frames of the at least two frames, or other data of the at least two frames, which is not elaborated here.

With respect to the position of the touch point at the (N+1) frame, in an embodiment, the position of the touch point at the (N+1) frame is the actual position of the touch point at the (N+1)th frame.

In this embodiment, after obtaining the actual positions of the touch point at the Nth frame and the frames before the Nth frame, and the actual position of the touch point at the (N+1)th frame, it is possible to predict the action between the Nth frame and the (N+1)th frame using the actual positions of the touch point in the previous frames. In detail, the point stability range of the Nth frame may be adjusted using the actual positions of the touch point in the previous frames, and the reported position of the touch point at the (N+1)th frame may be determined by comparing the actual position at the (N+1)th frame with the point stability range of the Nth frame. For example, the (N+1)th frame is the current frame, and if the point position at the (N+1)th frame needs to be reported in response to detecting the (N+1)th frame of the touch signal, the actual position at the (N+1)th frame is compared with the point stability range of the Nth frame, to determine the reported position of the touch point at the (N+1)th frame.

In another embodiment, the position of the touch point at the (N+1)th frame may be predicted from the actual positions of the touch point in the at least two frames before the (N+1)th frame of the touch signal.

In this embodiment, upon obtaining the actual positions of the touch point at the Nth frame and the frames before the Nth frame, it is possible to predict the position at the (N+1)th frame (the predicted position of the (N+1)th frame) by using the actual positions of the touch point in the previous frames, and the point stability range of the Nth frame may be adjusted according to the actual positions of the touch point in the previous frames, and the reported position of the touch point at the (N+1)th frame may be determined by comparing the predicted position of the (N+1)th frame with the point stability range of the Nth frame.

In this embodiment, the position of the (N+1)th frame may be reported without obtaining the actual position of the touch point at the (N+1)th frame.

With respect to predicting the position of the touch point at the (N+1)th frame, in an example, the position of the touch point at the (N+1)th frame may be obtained by the weighted sum of the position of the touch point at the (N−1)th frame and the position of the touch point at the Nth frame. For example, the position of the touch point at the (N−1)th frame is multiplied with a first weight value, the position of the touch point at the Nth frame is multiplied with a second weight value, and the two products are summed to obtain the position of the touch point at the (N+1)th frame. The first weight value and the second weight value may be set according to actual requirements. For example, if fast speed is expected, the second weight value may be greater than the first weight value, and if accuracy needs to be guaranteed, the second weight value may be equal to the first weight value. In this embodiment, by calculating the weighted sum of the position of the touch point at the (N−1)th frame and the position of the touch point at the Nth frame, the position of the touch point at the (N+1)th frame may be quickly obtained.

It should be understood that, other existing or future methods for determining the position of the touch point at the (N+1)th frame may also be applicable to the present disclosure, and shall be contained in the protection scope of the present disclosure. For example, the position of the touch point at the (N+1)th frame may be predicted from the speed, and accelerated speed of the touch point determined according to data of multiple frames.

With respect to the reported position of the touch point, it may be the position reported to the processing module for the touch point, for example, may be the reported point coordinate. The point report position of the touch point may be the actual position of the touch point, or may not be the actual position. Therefore, for clarity, the position reported to the processing module is referred to as the point report position.

If the action is the jitter of the touch object during stay, the position of the touch point at the Nth frame is determined as the point report position of the touch point at the (N+1)th frame, thereby avoiding the position update of the touch point caused by the jitter. If the action is the slide, the position of the touch point at the (N+1)th frame is determined as the point report position of the touch point at the (N+1)th frame, or the position close to the position of the touch point at the (N+1)th frame is determined as the point report position of the touch point at the (N+1)th frame. The position close to the position of the touch point at the (N+1)th frame may be a certain position in a specified range of the position of the touch point at the (N+1)th frame. For example, the position between the touch point at the Nth frame and the touch point at the (N+1)th frame and close to the touch point at the (N+1)th frame may be determined as the point report position of the touch point at the (N+1)th frame.

After determining the point report position of the touch point at the (N+1)th frame, the point report position of the touch point at the (N+1)th frame may be reported to the processing module. If the point report position of the touch point at the (N+1)th frame reported to the processing module is same as the point report position of the touch point at the Nth frame, the touch point is kept skill. If the point report position of the touch point at the (N+1)th frame reported to the processing module is different from the point report position of the touch point at the Nth frame, the touch point moves.

Various technical features in the above implementations may be combined arbitrarily, as long as there is no conflict or contradiction between the combinations of features, but they are not described one by one due to space limitations. Therefore, any combination of various technical features in the above implementations also falls within the scope disclosed in this specification.

Figure 4:
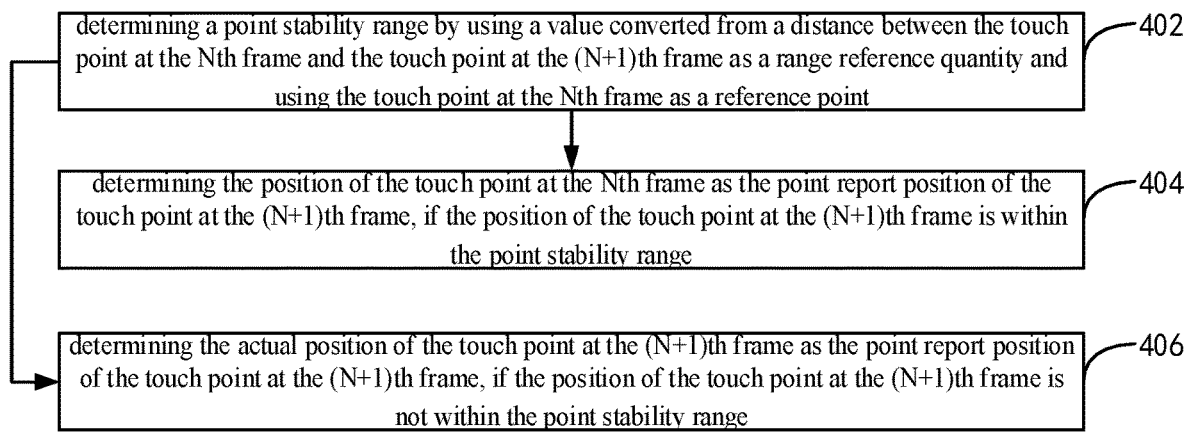
FIG. 4 is a flowchart of another method for determining a point report position of a touch point illustrated according to an exemplary embodiment of the present disclosure.

As illustrated in FIG. 4, which is a flowchart of another method for determining a point report position of a touch point illustrated according to an exemplary embodiment of the present disclosure, based on the above embodiment, another embodiment is described. In this embodiment, the method may include followings.

At block 402, the point stability range of the Nth frame is determined by using the value converted from the distance between the touch point at the Nth frame and the touch point at the (N+1)th frame as the range reference quantity, and using the touch point at the Nth frame as the reference point.

At block 404, the position of the touch point at the Nth frame is determined as the point report position of the touch point at the (N+1)th frame, if the position of the touch point at the (N+1)th frame is within the point stability range.

At block 406, the actual position of the touch point at the (N+1)th frame is determined as the point report position of the touch point at the (N+1)th frame, if the position of the touch point at the (N+1)th frame is not within the point stability range.

With this embodiment, the stability of the report point is improved while improving the hand following performance, which may avoid in the situation that the finger slides and then lifts vertically, the lifted coordinate has unstable jitter, and may also avoid in the situation that the finger slides and then leaves naturally and non-vertically, the fast slide becomes the slow slide or the slow slide becomes the fast slide due to wrong determination of the accelerated speed and the speed. By predicting the action, the size of the point stability range can be adjusted dynamically, which is not a single fixed range.

For each of the aforementioned method embodiments, they are expressed as a series of combinations of actions for the purpose of simple description, but those skilled in the art should be aware that the present disclosure is not limited by the sequence of actions described, since certain steps may be performed in other sequences or simultaneously according to the present disclosure.

Secondly, those skilled in the art should also be aware that the embodiments described in the specification are optional embodiments and the actions and modules involved are not necessarily necessary for the present disclosure.

Corresponding to the above embodiments of the method for determining the point report position of the touch point, the present disclosure further provides embodiments of an apparatus for determining a point report position of a touch point, an electronic device where the apparatus is applied, and a storage medium.

Figure 5:
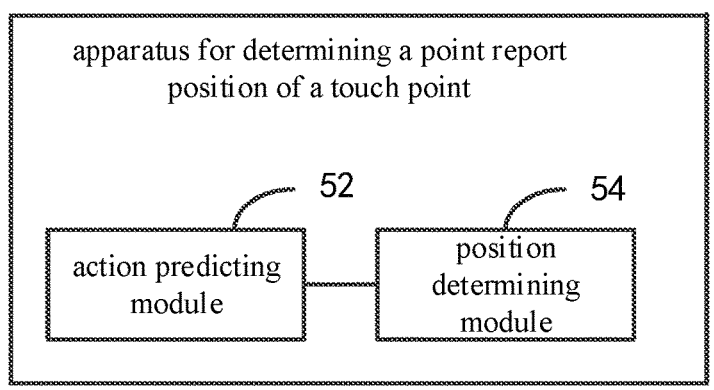
FIG. 5 is a block diagram of an apparatus for determining a point report position of a touch point illustrated according to an exemplary embodiment of the present disclosure.

As illustrated in FIG. 5, which is a block diagram of an apparatus for determining a point report position of a touch point illustrated according to an exemplary embodiment of the present disclosure, the apparatus includes an action predicting module 52 and a position determining module 54.

The action predicting module 52 is configured to predict whether an action between an Nth frame and an (N+1)th frame of a touch signal is a jitter or a slide of a touch object during stay, according to position change information of a touch point in at least two frames before the (N+1)th frame of the touch signal.

The position determining module 54 is configured to determine a position of the touch point at the Nth frame as the point report position of the touch point at the (N+1)th frame, if the action is the jitter of the touch object during stay; and determine the position of the touch point at the (N+1)th frame or a position close to the position of the touch point at the (N+1)th frame as the point report position of the touch point at the (N+1)th frame, if the action is the slide of the touch object during stay.

In an embodiment, the action predicting module 52 is configured to determine a point stability range by using a value converted from a distance between the touch point at the Nth frame and the touch point at the (N+1)th frame as a range reference quantity and using the touch point at the Nth frame as a reference point; determine that the action is the jitter of the touch object during stay, if the position of the touch point at the (N+1)th frame is within the point stability range; and determine that the action is the slide of the touch object during stay, if the position of the touch point at the (N+1)th frame is not within the point stability range.

In an embodiment, the position of the touch point at the (N+1)th frame is predicted from actual positions of the touch point in the at least two frames before the (N+1)th frame of the touch signal.

In an embodiment, the position of the touch point at the (N+1)th frame is an actual position of the touch point at the (N+1)th frame.

In an embodiment, the range reference quantity is obtained by multiplying the distance with a specified ratio, in which the specified ratio is less than or equal to one.

The implementation of the functions and roles of respective modules in the device is detailed in the implementation process of corresponding steps in the method above, which will not be elaborated here.

For the device embodiments, as they basically correspond to the method embodiments, the relevant parts can be referred to the description of the method embodiments. The device embodiments described above are only schematic, wherein the modules illustrated as separate parts may or may not be physically separated, and the components displayed as modules may or may not be physical modules, which can be located in one place, or can be distributed to multiple network modules. Some or all modules can be selected according to the actual needs to achieve the purpose of the disclosed scheme. Ordinary technicians in the field can understand and implement it without creative labor.

Accordingly, the present disclosure also provides a computer readable storage medium on which a computer program is stored. When the computer program is executed by a processor, the method in any of above embodiments is implemented.

The present disclosure may be in the form of computer program products implemented on one or more storage medium containing program codes (including but not limited to disk storage, CD-ROM, optical storage, etc.). The available storage medium includes permanent and non-permanent, removable and non-removable medium, which can be used by any method or technology to realize information storage. Information can be computer readable instructions, data structures, modules of programs, or other data. Examples of computer storage medium include but are not limited to, phase-change memory (PRAM), static random access memory (SRAM) and dynamic random access memory (DRAM), and other types of random access memory (RAM), read-only memory (ROM), electrically erasable programmable read only memory block (EEPROM), flash memory, or other memory technology, CD-ROM, versatile disc (DVD) or other optical storage, magnetic tape cassette tape magnetic disk storage or other magnetic storage devices, or any other non-transfer medium, that can be used to store information that can be accessed by the computing device.

Correspondingly, embodiments of the present disclosure provide an electronic device. The electronic device includes a processor, and a memory configured to store instructions executable by the processor. The processor is configured to implement any method for determining the point report position of the touch point. For example, one method may include:

predicting whether an action between an Nth frame and an (N+1)th frame of a touch signal is a jitter or a slide of a touch object during stay, according to position change information of a touch point in at least two frames before the (N+1)th frame of the touch signal;

determining a position of the touch point at the Nth frame as the point report position of the touch point at the (N+1)th frame, if the action is the jitter of the touch object during stay; and determining the position of the touch point at the (N+1)th frame or a position close to the position of the touch point at the (N+1)th frame as the point report position of the touch point at the (N+1)th frame, if the action is the slide of the touch object during stay.

Figure 6:
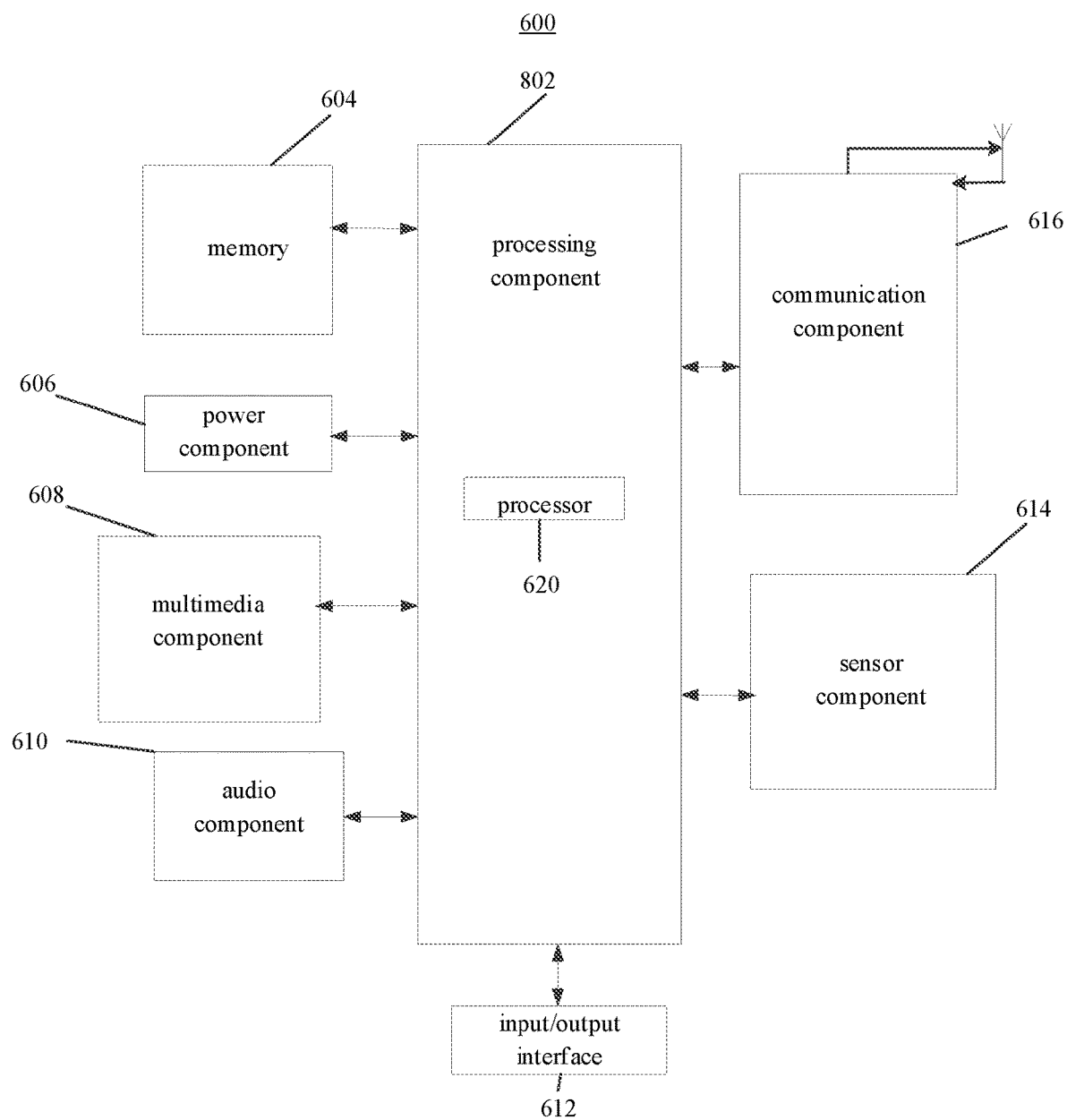
FIG. 6 is a schematic diagram of an apparatus for determining a point report position of a touch point illustrated according to an exemplary embodiment of the present disclosure.

FIG. 6 is a schematic diagram of an apparatus 600 for determining a point report position of a touch point illustrated according to an exemplary embodiment of the present disclosure. For example, the apparatus 800 may be a user equipment, which specifically, may be a mobile phone, a computer, a digital broadcast terminal, a messaging device, a game console, a tablet device, a medical device, an exercise device, a personal digital assistant, a wearable device such as a smart watch, mart glasses, a smart bracelet, smart shoes and so on.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 normally controls the overall operation (such as operations associated with displaying, telephone calls, data communications, camera operations and recording operations) of the apparatus 600.

The processing component 602 may include one or a plurality of processors 620 to execute instructions so as to perform all or part of the steps of the above described method. In addition, the processing component 602 may include one or a plurality of units to facilitate interactions between the processing component 602 and other components. For example, the processing component 602 may include a multimedia unit to facilitate interactions between the multimedia component 608 and the processing component 602.

The memory 604 is configured to store various types of data to support operations at the apparatus 600. Examples of such data include instructions for any application or method operated on the apparatus 600, contact data, phone book data, messages, images, videos and the like. The memory 604 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 606 provides power to various components of the apparatus 600. The power component 606 may include a power management system, one or a plurality of power sources and other components associated with power generation, management, and distribution of the apparatus 600.

The multimedia component 608 includes a screen that provides an output interface between the apparatus 600 and the user. In some embodiments, the screen may include a liquid crystal display (LCD) and a touch panel (TP). In some embodiments, an organic light-emitting diode (OLED) display or other types of displays can be adopted.

If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 608 includes a front camera and/or a rear camera. When the apparatus 600 is in an operation mode such as a shooting mode or a video mode, the front camera and/or the rear camera may receive external multimedia data. Each front camera and rear camera may be a fixed optical lens system or have a focal length and an optical zoom capability.

The audio component 610 is configured to output and/or input an audio signal. For example, the audio component 610 includes a microphone (MIC) that is configured to receive an external audio signal when the apparatus 600 is in an operation mode such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and a peripheral interface unit. The peripheral interface unit may be a keyboard, a click wheel, a button and so on. These buttons may include, but are not limited to, a home button, a volume button, a start button, and a locking button.

The sensor assembly 614 includes one or a plurality of sensors for providing the apparatus 600 with various aspects of status assessments. For example, the sensor component 614 may detect an open/closed state of the apparatus 600 and a relative positioning of the components. For example, the components may be a display and a keypad of the apparatus 600. The sensor component 614 may also detect a change in position of the apparatus 600 or a component of the apparatus 600, the presence or absence of contact of the user with the apparatus 600, the orientation or acceleration/deceleration of the apparatus 600 and a temperature change of the apparatus 600. The sensor component 614 may include a proximity sensor configured to detect the presence of nearby objects without any physical contact. The sensor component 614 may also include a light sensor (such as a CMOS or a CCD image sensor) for use in imaging applications. In some embodiments, the sensor component 614 may further include an acceleration sensor, a gyro sensor, a magnetic sensor, a pressure sensor, or a temperature sensor.

The communication component 616 is configured to facilitate wired or wireless communication between the apparatus 600 and other devices. The apparatus 600 may access a wireless network based on a communication standard such as Wi-Fi, 2G, 3G, 4G, or 5G, or a combination thereof. In an exemplary embodiment, the communication component 616 receives broadcast signals or broadcast-associated information from an external broadcast management system via a broadcast channel. In an exemplary embodiment, the communication component 616 further includes a near field communication (NFC) unit to facilitate short range communication.

In an exemplary embodiment, the apparatus 600 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above shooting method.

In an exemplary embodiment, there is also provided a non-transitory computer readable storage medium including instructions, such as a memory 604 including instructions. When the instructions in the storage medium are executed by the processor 620 of the apparatus 600, the apparatus 600 is caused to implement the method for determining the point report position of the touch point, the method including:

predicting whether an action between an Nth frame and an (N+1)th frame of a touch signal is a jitter or a slide of a touch object during stay, according to position change information of a touch point in at least two frames before the (N+1)th frame of the touch signal;

determining a position of the touch point at the Nth frame as the point report position of the touch point at the (N+1)th frame, if the action is the jitter of the touch object during stay; and determining the position of the touch point at the (N+1)th frame or a position close to the position of the touch point at the (N+1)th frame as the point report position of the touch point at the (N+1)th frame, if the action is the slide of the touch object during stay.

The non-transitory computer readable storage medium may be ROM, RAM, CD-ROM, magnetic tape, floppy disk, optical data storage device, and so on.

Various embodiments of the present disclosure also provide an electronic device.

Figure 7:
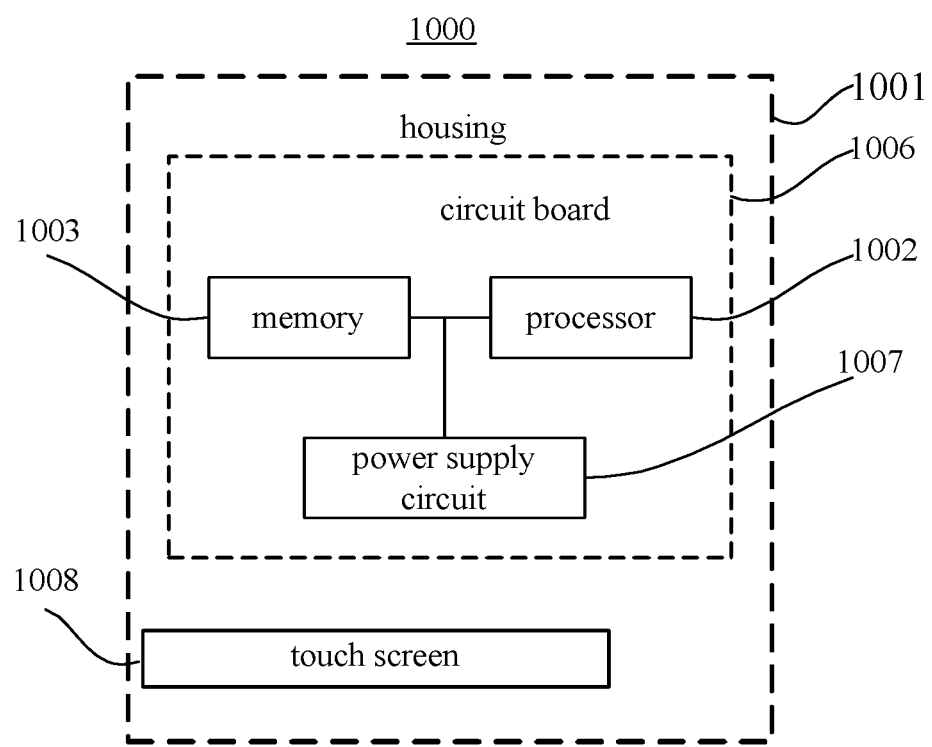
FIG. 7 is a schematic diagram of an electronic device according to embodiments of the present disclosure.

FIG. 7 is a block diagram of an electronic device according to an embodiment of the present disclosure. Referring to FIG. 7, the electronic device 1000 of the present disclosure includes a housing 1001, a processor 1002, a memory 1003, a circuit board 1006, a power supply circuit 1007, and a touch screen 1008. The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. The touch screen 1008 is configured to receive an input from a touch object and to generate a touch signal.

The processor 1002 is configured to predict whether an action between an Nth frame and an (N+1)th frame of the touch signal is a jitter or a slide of the touch object during stay, according to position change information of a touch point in at least two frames before the (N+1)th frame of the touch signal; and determine a position of the touch point at the Nth frame as the point report position of the touch point at the (N+1)th frame, if the action is the jitter of the touch object during stay; and determine the position of the touch point at the (N+1)th frame or a position close to the position of the touch point at the (N+1)th frame as the point report position of the touch point at the (N+1)th frame, if the action is the slide of the touch object during stay.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for determining a point report position of a touch point, comprising:
predicting whether an action between an Nth frame and an (N+1)th frame of a touch signal is a jitter or a slide of a touch object during stay according to position change information of a touch point in at least two frames before the (N+1)th frame of the touch signal;
determining a position of the touch point at the Nth frame as the point report position of the touch point at the (N+1)th frame, in a case that the action is the jitter of the touch object during stay; and
determining the position of the touch point at the (N+1)th frame or a position close to the position of the touch point at the (N+1)th frame as the point report position of the touch point at the (N+1)th frame, in a case that the action is the slide of the touch object during stay;
wherein said predicting whether the action between the Nth frame and the (N+1)th frame of the touch signal is the jitter or the slide of the touch object during stay, according to position change information of the touch point in at least two frames before the (N+1)th frame of the touch signal compromises:
determining a point stability range by using a value converted from a distance between the touch point at the Nth frame and the touch point at the (N+1)th frame as a range reference quantity and using the touch point at the Nth frame as a reference point, wherein the range reference quantity is obtained by multiplying the distance with a specified ratio, in which the specified ratio is less than or equal to one;
determining that the action is the jitter of the touch object during stay, in a case that the position of the touch point at the (N+1)th frame is within the point stability range; and
determining that the action is the slide of the touch object during stay, in a case that the position of the touch point at the (N+1)th frame is not within the point stability range.

2. The method according to claim 1, wherein the point report position of the touch point at the (N+1)th frame is predicted from actual positions of the touch point in the at least two frames before the (N+1)th frame of the touch signal.

3. The method according to claim 1, wherein the point report position of the touch point at the (N+1)th frame is an actual position of the touch point at the (N+1)th frame.

4. A mobile terminal implementing the method according to claim 1, comprising a touch screen, wherein the mobile terminal is configured to, based on the prediction of the jitter or slide, take into account both a point stability, which avoids updating a point coordinate even for small coordinate jitter, and a hand following performance, which avoids a large distance between a reported point coordinate and an actual touch point coordinate of the touch object for ensuring the point stability.

5. The mobile terminal according to claim 4, wherein the mobile terminal is configured to improve stability of the report point while improving the hand following performance, thereby reducing in a situation that the finger slides and then lifts vertically, the lifted coordinate has unstable jitter, and also reducing in a situation that the finger slides and then leaves naturally and non-vertically, a fast slide becomes a slow slide or a slow slide becomes a fast slide due to incorrect determination of acceleration and speed.

6. The mobile terminal according to claim 5, wherein the mobile terminal is configured to, based on the prediction, adjust size of the point stability range dynamically.

7. The mobile terminal according to claim 5, wherein the mobile terminal is configured to determine a radius R of the point stability range of the Nth frame according to:

$$R = R_{default} * \frac{D}{D_{default}}$$

where $R_{default}/D_{default}$ denotes a specified ratio, and D denotes the distance between the (N−1)th frame and the Nth frame; in a case that a distance between the Nth frame and the (N+1)th frame is less than or equal to the radius R, the action is considered as a micro jitter, and more weight is given to stability, the coordinate reported is closer to the position of the Nth frame; in a case that the distance between the Nth frame and the (N+1)th frame is greater than the radius R, the action is considered as the slide.

8. An apparatus for determining a point report position of a touch point, comprising:
a processor; and
a memory, configured to store instructions executable by the processor,
wherein the processor is configured to run a program corresponding to the instructions by reading the instructions stored in the memory, so as to:
predict whether an action between an Nth frame and an (N+1)th frame of a touch signal is a jitter or a slide of a touch object during stay, according to position change information of a touch point in at least two frames before the (N+1)th frame of the touch signal; and determine a position of the touch point at the Nth frame as the point report position of the touch point at the (N+1)th frame, in a case that the action is the jitter of the touch object during stay; and determine the position of the touch point at the (N+1)th frame or a position close to the position of the touch point at the (N+1)th frame as the point report position of the touch point at the (N+1)th frame, in a case that the action is the slide of the touch object during stay;

wherein the processor is further configured to:

determine a point stability range by using a value converted from a distance between the touch point at the Nth frame and the touch point at the (N+1)th frame as a range reference quantity and using the touch point at the Nth frame as a reference point, wherein the range reference quantity is obtained by multiplying the distance with a specified ratio, in which the specified ratio is less than or equal to one;

determine that the action is the jitter of the touch object during stay, in a case that the position of the touch point at the (N+1)th frame is within the point stability range; and determine that the action is the slide of the touch object during stay, in a case that the position of the touch point at the (N+1)th frame is not within the point stability range.

9. The apparatus according to claim 8, wherein the processor is further configured to predict the point report position of the touch point at the (N+1)th frame from actual positions of the touch point in the at least two frames before the (N+1)th frame of the touch signal.

10. The apparatus according to claim 8, wherein the processor is further configured to determine the point report position of the touch point at the (N+1)th frame as an actual position of the touch point at the (N+1)th frame.

11. An electronic device, comprising a housing, a processor, a memory, a circuit board, a power supply circuit, and a touch screen, wherein, the circuit board is enclosed by the housing;

the processor and the memory are positioned on the circuit board;

the power supply circuit is configured to provide power for respective circuits or components of the electronic device;

the touch screen is configured to receive an input from a touch object and to generate a touch signal;

the processor is configured to:

predict whether an action between an Nth frame and an (N+1)th frame of the touch signal is a jitter or a slide of the touch object during stay, according to position change information of a touch point in at least two frames before the (N+1)th frame of the touch signal; and determine a position of the touch point at the Nth frame as the point report position of the touch point at the (N+1)th frame, in a case that the action is the jitter of the touch object during stay; and determine the position of the touch point at the (N+1)th frame or a position close to the position of the touch point at the (N+1)th frame as the point report position of the touch point at the (N+1)th frame, in a case that the action is the slide of the touch object during stay;

wherein said predicting whether the action between the Nth frame and the (N+1)th frame of the touch signal is the jitter or the slide of the touch object during stay, according to position change information of the touch point in at least two frames before the (N+1)th frame of the touch signal comprises:

determining a point stability range by using a value converted from a distance between the touch point at the Nth frame and the touch point at the (N+1)th frame as a range reference quantity and using the touch point at the Nth frame as a reference point, wherein the range reference quantity is obtained by multiplying the distance with a specified ratio, in which the specified ratio is less than or equal to one;

determining that the action is the jitter of the touch object during stay, in a case that the position of the touch point at the (N+1)th frame is within the point stability range; and determining that the action is the slide of the touch object during stay, in a case that the position of the touch point at the (N+1)th frame is not within the point stability range.

12. The electronic device according to claim 11, wherein the touch screen comprises an In-Cell screen, an On-Cell screen, an OGS screen, a G/G screen, a GFF screen.

13. The electronic device according to claim 11, wherein the processor is further configured to predict the point report position of the touch point at the (N+1)th frame from actual positions of the touch point in the at least two frames before the (N+1)th frame of the touch signal.

14. The electronic device according to claim 11, wherein the processor is further configured to determine the point report position of the touch point at the (N+1)th frame as an actual position of the touch point at the (N+1)th frame.

* * * * *